United States Patent
Traballoni et al.

(10) Patent No.: US 9,766,143 B2
(45) Date of Patent: Sep. 19, 2017

(54) SYSTEM AND ELECTRONIC METHOD FOR CHECKING THE CORRECT OPERATION OF BRAKING DEVICES

(71) Applicant: ATLAS COPCO BLM S.R.L., Paderno Dugnano (MI) (IT)

(72) Inventors: Marcello Traballoni, Paderno Dugnano (IT); Massimo Usuelli, Cinisello Balsamo (IT); Fabio Garavaglia, Paderno Dugnano (IT); Sergio Giannone, Milan (IT)

(73) Assignee: ATLAS COPCO BLM S.R.L., Paderno Dugnano (MI) (IT)

( * ) Notice: Subject to any disclaimer, the term of this patent is extended or adjusted under 35 U.S.C. 154(b) by 98 days.

(21) Appl. No.: 14/898,443

(22) PCT Filed: Jun. 10, 2014

(86) PCT No.: PCT/IB2014/062094
§ 371 (c)(1),
(2) Date: Dec. 14, 2015

(87) PCT Pub. No.: WO2014/203117
PCT Pub. Date: Dec. 24, 2014

(65) Prior Publication Data
US 2016/0138987 A1    May 19, 2016

(30) Foreign Application Priority Data
Jun. 18, 2013   (IT) .................................. MI13A1004

(51) Int. Cl.
*G01L 5/28*   (2006.01)
*G01L 25/00*   (2006.01)

(52) U.S. Cl.
CPC .............. *G01L 5/28* (2013.01); *G01L 25/003* (2013.01)

(58) Field of Classification Search
USPC ............................................................ 73/121
See application file for complete search history.

(56) References Cited

U.S. PATENT DOCUMENTS

| | | | |
|---|---|---|---|
| 4,150,559 A * | 4/1979 | Levy ....................... | G01L 3/205 73/1.09 |
| 6,202,028 B1 * | 3/2001 | Crane ................... | G01L 25/003 702/41 |

OTHER PUBLICATIONS

International Search Report in corresponding application dated Sep. 11, 2014.

* cited by examiner

*Primary Examiner* — Clayton E Laballe
*Assistant Examiner* — Warren K Fenwick
(74) *Attorney, Agent, or Firm* — Hedman & Costigan, P.C.; James V. Costigan; Kathleen A. Costigan

(57) ABSTRACT

System for checking the correct operation of braking devices on a test stand for industrial screwdrivers comprising a plurality of hydraulic brakes (F), to which the screwdriver is associated with, suitably controlled by a hydraulic circuit comprising a pump (P), a pressure regulating valve (VP). Each brake is provided with external measurement transducers (TR) connected to an electronic control board (SP). An electronic processor (U) that communicates with such board and controls such hydraulic circuit, such pump and such valve, comprises a suitable control program stored therein.

10 Claims, 3 Drawing Sheets

SYSTEM AND ELECTRONIC METHOD FOR CHECKING THE CORRECT OPERATION OF BRAKING DEVICES

The present invention refers to a system and electronic method for checking the correct operation of braking devices. In particular, the present invention applies to braking devices, for example of the hydraulic type which are adapted to test the correct operation of industrial screwdrivers.

Such screwdrivers are tested on test stands—like the one illustrated in FIG. 1—which comprise a plurality of hydraulic brakes F, to which the screwdriver is associated with, suitably controlled by a conventional hydraulic circuit comprising at least one pump P and at least one pressure regulating valve VP. Each brake is provided with external measurement transducers, connected to an electronic processor U and which are controlled by a suitable programme stored therein.

Each brake is characterised by its maximum braking capacity related to the physical characteristics of the brake.

The brakes in a stand are usually different with respect to each other, with the aim of being able to test screwdrivers different from each other in the same stand.

The SW programme, once the brake to be used for testing the screwdriver has been selected by the operator, is capable of progressively increasing the braking capacity up to attaining the complete stop of the electronic screwdriver.

The test of a screwdriver is a procedure that provides for the performance of a sequence of tightening operations whose torque and angle are measured.

Such values are used for calculating the metrics on which there are then applied the rules for validating the suitability of the screwdriver intended as precision and repeatability.

Clearly, besides the screwdriver, the suitability of the test depends on the reliability of the brake used.

A brake is deemed reliable if, during the performance of the test, it simulates the same physical joint at each tightening. Even as regards brakes, a reliability test should be provided for.

Thus, the Applicant aimed to perform such tests on the brakes without adding further components to the measuring stand for testing the screwdrivers.

In order to detect possible malfunctions in the acquisition of the torque and angle measurements regarding an electronic screwdriver, it was opted to implement a self-diagnosis mechanism for the brakes which allows to signal the identified malfunction to the operator and, if necessary, puts the brake out of service.

An aspect of the present invention regards an electronic system for checking the correct operation of braking devices having the characteristics of the attached claim 1.

A further aspect of the present invention regards an electronic method for checking the correct operation of braking devices having the characteristics of the attached claim.

Characteristics and advantages of the system and of the method according to the present invention will be clearer and evident from the following exemplifying and non-limiting description of an embodiment outlined with reference to the attached figures wherein:

FIG. 1 shows a general diagram of a test stand for checking industrial screwdrivers;

FIG. 2 indicates a flow algorithm regarding the method according to the present invention;

Figure 1:
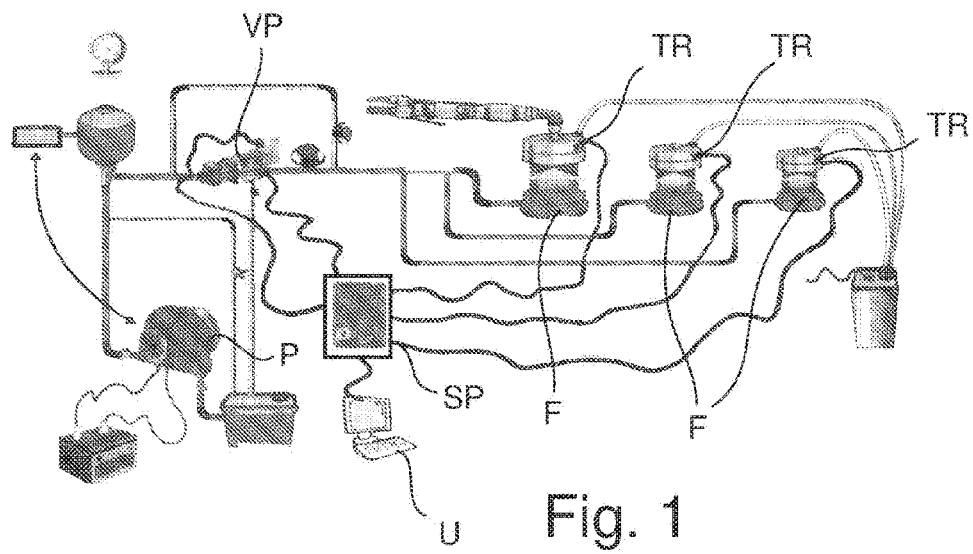

With reference to the aforementioned figures the stand or the checking system according to the present invention comprises a plurality of hydraulic brakes F, to which the screwdriver is associated with, suitably controlled by a conventional hydraulic circuit comprising at least one pump P and at least one pressure regulating valve VP.

Each brake is provided with external measurement transducers TR, connected to an electronic control board SP. An electronic processor U that communicates with such board comprises a suitable control programme stored therein.

The control programme, once the brake to be used for testing the screwdriver has been selected by the operator, is capable of progressively increasing the braking capacity up to attaining the complete stop of the electronic screwdriver.

During such operation the system according to the present invention performs the brake diagnosis operation activated as follows.

The parameters monitored by the transducers are the braking torque and the rotation angle from which there can be obtained the speed and the number of the revolutions carried out by the screwdriver.

In order to identify possible malfunctions in the acquisition of the torque and angle measurements regarding an electronic screwdriver, it was opted to implement a self-diagnosis mechanism which allows signalling the identified malfunction to the operator and, if necessary, put the brake out of service.

The self-diagnosis is made up of 3 check controls:
statistical controls;
static controls;
dynamic controls.

The statistical checks are verification operations carried out on parameters regarding the use of the brakes such as, the number of tightening operations and the number of revolutions carried out by the shaft during the tests.

For each of the parameters an alarm and control threshold is configured.

Upon overcoming the "alarm threshold" the stand signals to the operator that there is required assistance on the relative brake but maintaining normal operating conditions. Instead, upon exceeding the "control threshold" the brake can no longer be used by the operator in that disabled by the stand.

The alarm and control thresholds are set with of the reference values specific for each type of brake resulting from an analysis of the historical case study. The aforementioned thresholds may be subsequently modified as regards each brake for particular needs.

Examples of alarm thresholds may be 200,000 tightening operations and 2,000,000 revolutions and 400,000 tightening operations and 4,000,000 revolutions for the control thresholds.

Static controls are verifications carried out on the brakes measuring the "idle" torque ($T_{current}$), i.e. without any screwdriver applying torque or simply placed on the brake. The read value is used together with a reference value ($T_{ref}$), set at the manufacturer's initialisation of the system, according to the following formula:

$$\left|\frac{T_{ref} - T_{current}}{T_{ref}}\right| < \Delta_{max}$$

The maximum acceptable threshold ($\Delta_{max}$) is preferably fixed at a value equivalent to 1%, above which the performance of the test is hindered.

The dynamic controls are divided into 3 types and they are performed during the various tightening steps.

The types are:

"Dynamic zero" control

"SuperPeak" control

"Over" control

Figure 3:
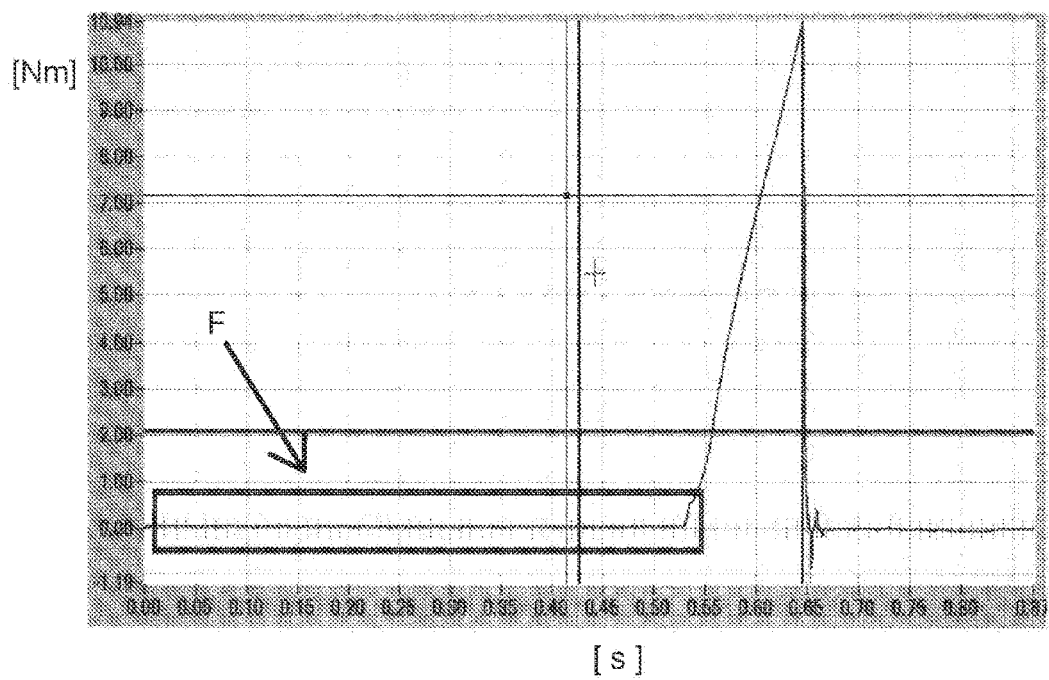
FIG. 3 is a chart regarding the trend, over time, of the torque acquired by the transducers during a tightening operation in which there is shown the "idle" braking part used for the dynamic analysis of the zero.
Figure 2:
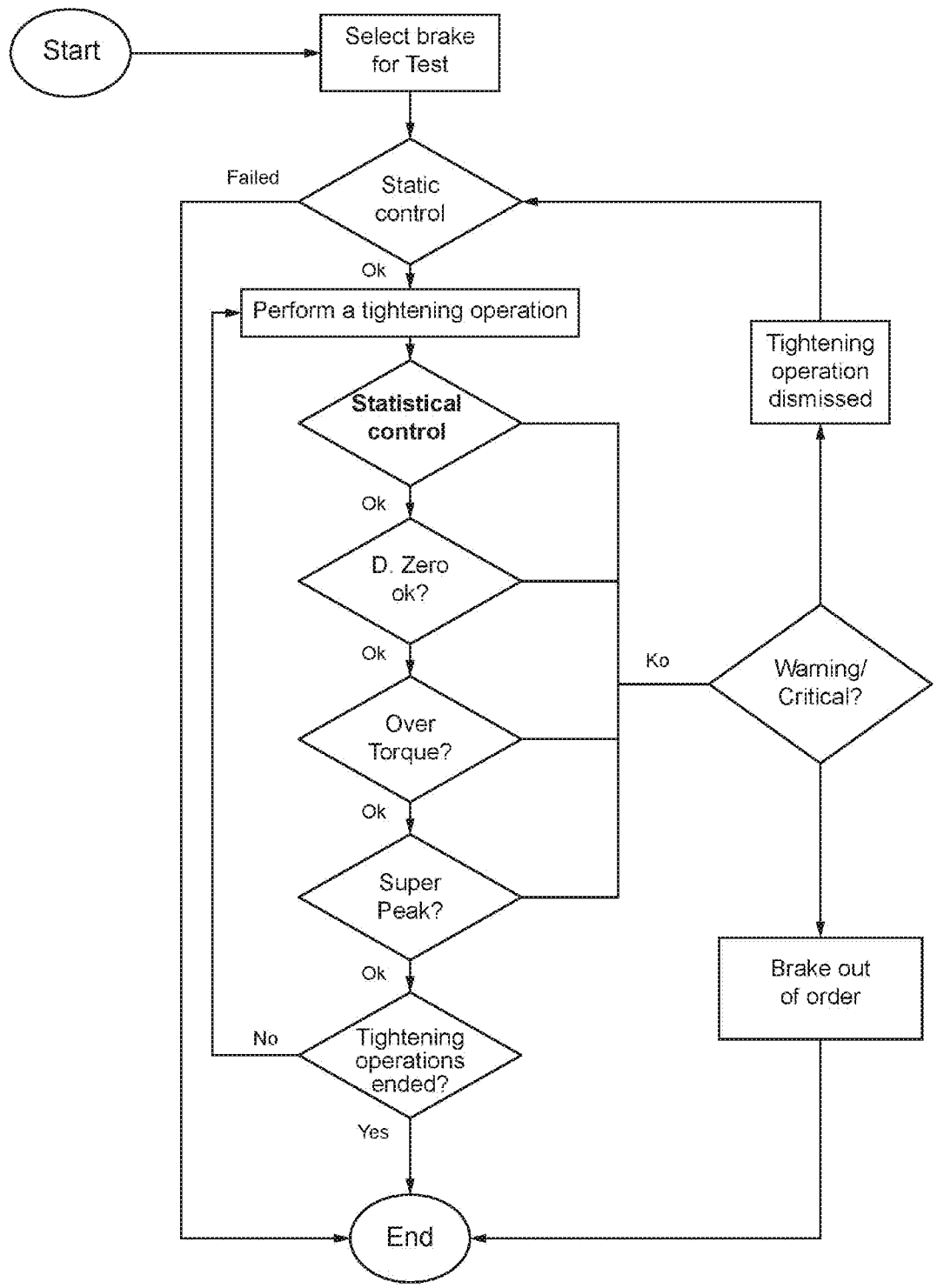

The dynamic zero control is performed during the first step of the screwing acquiring a predetermined number (1500) of torque/angle data at the frequency of configured sampling (4000 Hz), as observable in the chart of FIG. 3 (the arrow F indicates the acquisition area). Such values are acquired only when the brake reaches a predetermined braking torque (close to zero), the screwdriver rotates with a speed higher than 4 revolutions per minute and the speed is "stable" i.e. it has an excursion between 2 different measurements below 25%.

On these torque samples there is calculated the minimum ($T_{min}$), the maximum ($T_{max}$) and the average ($\overline{T}$) values. The condition of overcoming the test is given by the following formula $$\frac{\max(T_{max} - \overline{T}, \overline{T} - T_{min})}{T_{brake} * f(V_{media})} < \Delta_{max}$$

where $T_{brake}$ is the capacity of the brake expressed in points while $\Delta_{max}$ is the maximum allowed variation (for example 2%). The function $\eta(V_{media})$ is a correction coefficient introduced to manage fast screwdrivers.

Only when the aforementioned disparity is not checked, an error is signalled to the operator and the performed measurement is nullified. The programme counts these failures and, upon overcoming a predetermined number (for example 10), the brake in question is put out of service.

The correction factor for fast screwdrivers was introduced due to the fact that the high rotational speed of the screwdriver generates oscillations on the shaft of the brake, especially if the tightening is not performed correctly (for example, keeping the screwdriver not orthogonal to the brake or not using the reaction bar).

In addition, the impact of such phenomenon is more evident proportionally to the low nominal capacity of the brake. Brakes with low nominal torques (for example, 2 Nm), are actually characterized by a smaller mass with respect to the brakes with greater nominal torque and they are thus more susceptible to the transmissions of the amount of motion by the screwdriver.

In any case, the aforementioned oscillations are translated into an increase of the torque in the samples used for calculating the dynamic zero and an ensuing increase of the same.

In order to compensate these unwanted effects the present invention proposes a table of correction coefficients wherein the brakes are classified by levels. The levels are established according of the rotational speed comprised in the range.

| Level | $V_{media}$ [revolutions per minute] | $f(V_{media})$ |
|---|---|---|
| 1 | <$V_1$ | $f_1$ |
| 2 | $V_1 < v < V_2$ | $f_2$ |
| ... | ... | ... |
| n | >$V_n$ | $f_n$ |

For example, in case of three level brakes speeds V1 and V2 are respectively 1500 and 2500 g/m thus determining three levels: 0÷1500 for the first level 1500÷2500 for the second level and >2500 for the third level.

Figure 4:
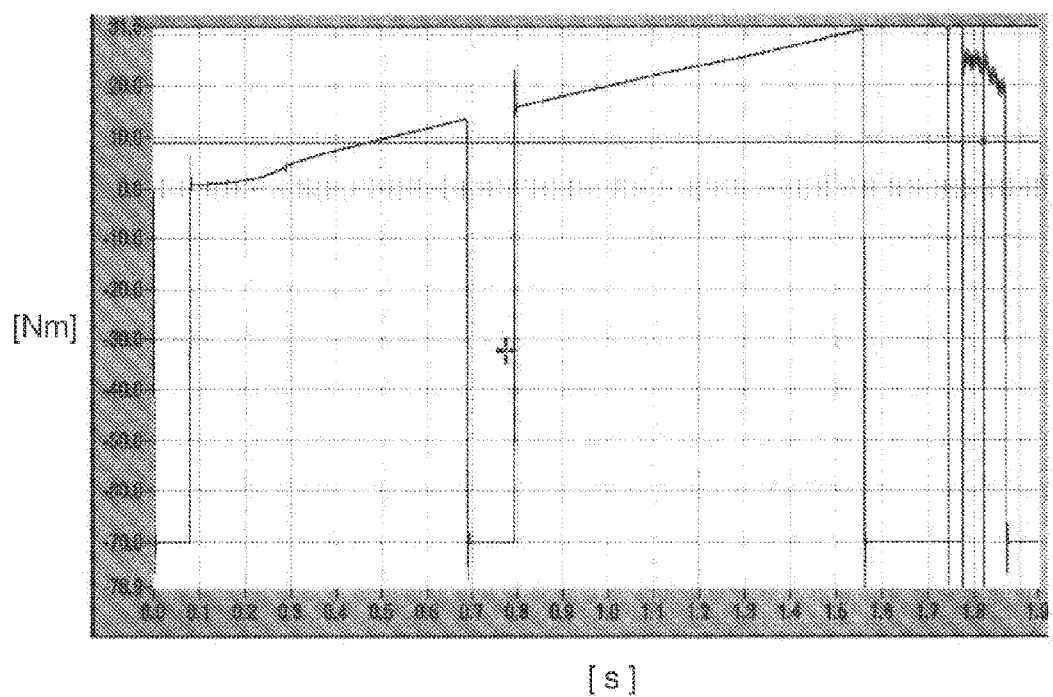
FIG. 4 is a chart regarding the trend, over time, of the torque acquired by the transducers of the brake during a braking operation in which the phenomenon referred to as "SuperPeak" occurs.

To the control called "SuperPeak" there is associated a temporary disconnection of the brushes used for acquiring the torque during a tightening operation. Such control is carried out downstream of the tightening analysing the values of the entire curve of the acquired torque (example in FIG. 4).

The test is carried out according to the present formula $$|T_{i+1} - T_i| < \frac{P_{Vref} - P_{v0}}{2}$$

wherein $T_{i+1} - T_i$ is the difference between the two samples in absolute value and $$\frac{P_{Vref} - P_{v0}}{2}$$

is the reference value calculated as follows.

$P_{Vref}$ are the points read on the acquisition channel when there is injected a reference value of the brake (2 mV/V) while $P_{v0}$ are the points read when it is forced 0 (mV/V).

Once the aforementioned conditions do not occur for a predetermined number of times, the brake is declared out of order and disabled by the stand and the test is ended.

The "over" control is mainly carried out in real time during the acquisition of the curve to avoid possible damage to the brake. If the read value exceeds a configured alarm threshold for a number of samples, even non-contiguous, greater than a predetermined number (for example 80 samples) the tightening is interrupted and the measurement is invalidated and signalled to the operator.

Upon finishing the tightening the acquired maximum torque value is calculated and should it exceed the alarm threshold the measurement is invalidated and the malfunction is signalled to the operator just like in case of real time.

If the value also exceeds a second threshold referred to as control threshold, the brake is put out of service and it shall not be used up to the intervention of the assistance.

The self-diagnosis programme operates as follows:
a) detecting the idle torque of a predetermined brake ($T_{current}$);
b) checking whether such measured value is not less than a reference value ($T_{ref}$) by a certain predetermined percentage ($\Delta_{max}$),
c) performing a tightening operation with the screwdriver on such brake,
d) checking whether the number of tightening operations carried out by the operator and the number of revolutions carried out by the shaft on such brake are below an alarm threshold,
e) detecting a predetermined amount of samples of braking torque in a predetermined time, f) extracting the minimum ($T_{min}$), the maximum ($T_{max}$) of the samples and calculating the average (T), g) based on such minimum, average and maximum values, checking whether the variance of the values is below a maximum allowed variation ($\Delta_{max}$), h) checking whether the difference in braking torque values of contiguous pairs of samples is below a reference value established for such brake, i) checking whether none of the detected torque value exceeds a configured alarm threshold.

If in step b) the measured value is not below the reference value ($T_{ref}$) of the predefined percentage ($\Delta_{max}$), the correct operation test does not proceed with the subsequent steps b)-i).

If in step d) the number of tightening operations carried out by the operator and the number of revolutions carried out by the shaft on such brake are not below the alarm threshold, but not greater than a control threshold, the brake is declared under assistance and there follows the subsequent step e).

If in step d) the number of tightening operations carried out by the operator and the number of revolutions carried out by the shaft on such brake are not below the control threshold the brake is declared out of order and disabled by the stand and the test is ended.

If in step g) the variance of the values is not below the maximum allowed variation ($\Delta_{max}$), an error is signalled to the operator.

If in step g) the variance of the values is not below the maximum allowed variation ($\Delta_{max}$), for a predetermined number of times the brake is declared out of order and disabled by the stand and the test is ended.

If in step h) the difference of values of braking torque of contiguous pairs of samples is not below the reference value established for such brake for a predetermined number of times, the brake is declared out of order and disabled by the stand and the test is ended.

If in step i) there is at least one detected torque value which exceeds the alarm threshold but not the configured control threshold, an error is signalled to the operator.

If in step i) there is at least one detected torque value which exceeds the alarm threshold and the configured control threshold, the brake is declared out of order and disabled by the stand and the test is ended.

The invention claimed is:

1. An electronic method for checking the correct operation of braking devices on a test stand for industrial screwdrivers comprising the following steps:
   a) detecting the idle torque value of a predetermined brake ($T_{current}$);
   b) checking that a measured torque value is not less than a reference torque value ($T_{ref}$) by a certain predetermined percentage ($\Delta_{max}$);
   c) performing a tightening operation with a screwdriver on a brake; and
   d) checking that the number of tightening operations carried out by an operator and the number of revolutions carried out by a shaft on a brake are below an alarm threshold;
   e) detecting a predetermined amount of samples of braking torque values in a predetermined time;
   f) extracting the minimum torque value ($T_{min}$), the maximum torque value ($T_{max}$) of the samples and calculating the average torque value (T);
   g) based on minimum, average and maximum torque values, checking whether a variance of the values is below a maximum allowed variation ($\Delta_{max}$);
   h) checking whether the difference in braking torque values of contiguous pairs of samples is less than a reference torque value established for a brake; and
   i) checking that none of the detected torque values exceeds a configured alarm threshold.

2. Method according to claim 1, wherein if in step b) the measured torque value is not less than the reference torque value ($T_{ref}$) by the predetermined percentage ($\Delta_{max}$), the correct operation test does not proceed with the subsequent steps c)-i).

3. Method according to claim 1, wherein if in step d) the number of tightening operations carried out by the operator and the number of revolutions carried out by the shaft on a brake are not below the alarm threshold, but not greater than a control threshold the brake is declared under assistance and it passes to the subsequent step e).

4. Method according to claim 3, wherein if in step d) the number of tightening operations carried out by the operator and the number of revolutions carried out by the shaft on such a brake are not below the control threshold, the brake is declared out of order and disabled by the stand and the test is ended.

5. Method according to claim 1, wherein if in step g) the variance of the values is not below the maximum allowed variance ($\Delta_{max}$), an error is signalled to the operator.

6. Method according to claim 5, wherein if in step g) the variance of the values is not below the maximum allowed variance ($\Delta_{max}$), for a predetermined number of times the brake is declared out of order and disabled by the stand and the test is ended.

7. Method according to claim 1, wherein if in step h) the difference in braking torque values of contiguous pairs of samples is not less than the reference torque value established for a brake for a predetermined number of times, the brake is declared out of order and disabled by the test stand and the test is ended.

8. Method according to claim 1, wherein if in step i) there is at least one detected torque value that exceeds the alarm threshold but not the configured control threshold an error is signalled to the operator.

9. Method according to claim 8, wherein if in step i) there is at least one detected torque value that exceeds the alarm threshold and the control threshold configured, the brake is declared out of order and disabled by the stand and the test is ended.

10. A system for checking the correct operation of braking devices on a test stand for industrial screwdrivers on which the method according to claim 1 is applied, comprising:
   a plurality of hydraulic brakes (F), with which the screwdriver is associated, suitably controlled by a conventional hydraulic circuit comprising at least one pump (P), at least one pressure-regulating valve (VP),
   each brake being provided with external measurement transducers (TR), connected to an electronic control board (SP)
   an electronic processor (U) that communicates with the electronic control board and that controls a hydraulic circuit, a pump, and a valve, comprising a suitable non-transitory, control program stored in the electronic control board RAM and/or ROM,
   when a brake to be used to test an industrial screwdriver has been selected by the operator, program instructions executed by the non-transitory control program enable braking to progressively increase until the electronic screwdriver is completely stopped.

* * * * *